United States Patent [19]
Van Lerberghe

[11] Patent Number: 6,087,039
[45] Date of Patent: Jul. 11, 2000

[54] ACCUMULATOR DEVICE FOR AN ELECTRICAL AND/OR ELECTRONIC APPARATUS AND TELECOMMUNICATION TERMINAL HAVING SUCH A DEVICE

[75] Inventor: Steven Van Lerberghe, Le Mans, France

[73] Assignee: U.S. Philips Corporation, New York, N.Y.

[21] Appl. No.: 09/011,566

[22] PCT Filed: Jun. 6, 1997

[86] PCT No.: PCT/IB97/00656

§ 371 Date: Feb. 13, 1998

§ 102(e) Date: Feb. 13, 1998

[87] PCT Pub. No.: WO97/48165

PCT Pub. Date: Dec. 18, 1997

[30] Foreign Application Priority Data

Jun. 14, 1996 [FR] France ................................. 96 07445

[51] Int. Cl.[7] ............................. H01M 2/20; H01M 2/30
[52] U.S. Cl. ................................................ 429/150; 429/9
[58] Field of Search ........................................ 429/9, 150

[56] References Cited

U.S. PATENT DOCUMENTS

| | | |
|---|---|---|
| 3,200,014 | 8/1965 | Roberts . |
| 3,758,345 | 9/1973 | Toth . |
| 5,047,300 | 9/1991 | Juergens ..................................... 429/94 |
| 5,549,984 | 8/1996 | Dougherty ................................ 429/61 |
| 5,849,426 | 12/1998 | Thomas et al. ............................. 429/7 |
| 5,857,148 | 1/1999 | Weisshappel et al. .................... 455/90 |

FOREIGN PATENT DOCUMENTS

0688082A1   12/1995   European Pat. Off. .

*Primary Examiner*—Maria Nuzzolillo
*Assistant Examiner*—Tracy Dove
*Attorney, Agent, or Firm*—Dicran Halajian

[57] ABSTRACT

An accumulator device for an apparatus intermittently operating between a back-up rest state and an active state includes at least first and second accumulator assemblies. A connection circuit is provided for connecting the assemblies to the apparatus and includes at least one switch element, and a control circuit of the switch element connects the second accumulator assembly to the apparatus during the active state.

14 Claims, 1 Drawing Sheet

ACCUMULATOR DEVICE FOR AN ELECTRICAL AND/OR ELECTRONIC APPARATUS AND TELECOMMUNICATION TERMINAL HAVING SUCH A DEVICE

BACKGROUND OF THE INVENTION

The invention relates to an accumulator device for an apparatus intermittently operating between a standby state and an active state, comprising:

at least a first accumulator assembly formed by at least one accumulator element, at least a second accumulator assembly formed by at least one accumulator element.

The invention also relates to a telecommunication terminal comprising such a device.

Such a device finds highly significant applications, notably for telecommunication apparatus such as terminals for cordless telephone, GSM, . . . , and so on.

A device of this type is described in European Patent No. 0 688 082. This document proposes to extend a main accumulator by a back-up accumulator so that, when the main accumulator is discharged, it can be exchanged without data being lost, because the energy of the back-up accumulator is sufficient for maintaining them.

The invention proposes a device of this type which may provide the backup function, but which is rather adapted to the apparatus operating intermittently. This is notably the case with terminals of the GSM network which, when they are communicating, work only one eighth of the time.

SUMMARY OF THE INVENTION

Therefore, such a device is characterized in that it furthermore comprises:

a connection circuit for connecting said assemblies to said apparatus which comprises at least one switch element, a control circuit of said switch elements for connecting said second assembly to said apparatus during the active state.

These and other aspects of the invention will be apparent from and elucidated with reference to the embodiments described hereinafter.

DESCRIPTION OF PREFERRED EMBODIMENTS

Figure 1:
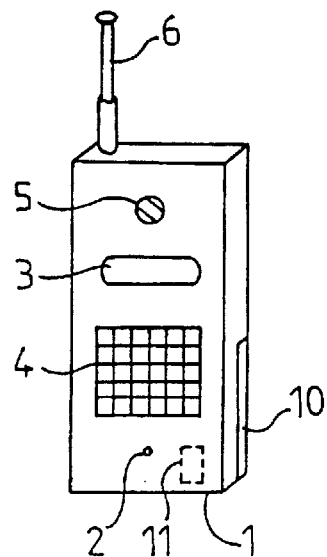
FIG. 1 shows a terminal according to the invention.

The terminal shown in FIG. 1 is a GSM terminal, for example. It comprises a casing 1 on which are provided a microphone 2, a screen 3, a keypad 4, an earpiece 5 and an antenna 6. For supplying power to this device, it includes two accumulator assemblies 10 and 11. The accumulator 10 is the main accumulator which forms what may be called the pack battery and the accumulator 11 is placed inside the casing 1 and forms an auxiliary accumulator represented in a dashed line in the Figure.

Figure 2:
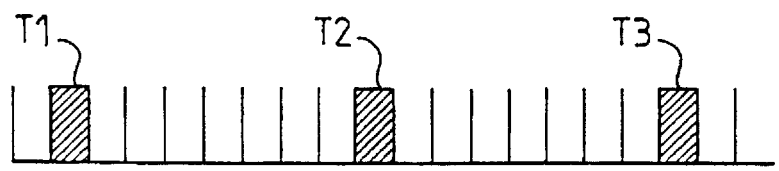
FIG. 2 shows a GSM frame.

The terminal concerned can only transmit in time slots . . . T1, T2, T3, . . . provided in a time frame generated by the GSM transmission system. This time frame is represented in a diagrammatic form in FIG. 2. These time slots . . . T1, T2, T3, . . . are separated by seven time slots during which the terminal is in the state of rest.

According to the invention, the power to the terminal is supplied by the auxiliary accumulator during the time slots . . . T1, T2, T3, . . . .

Figure 3:
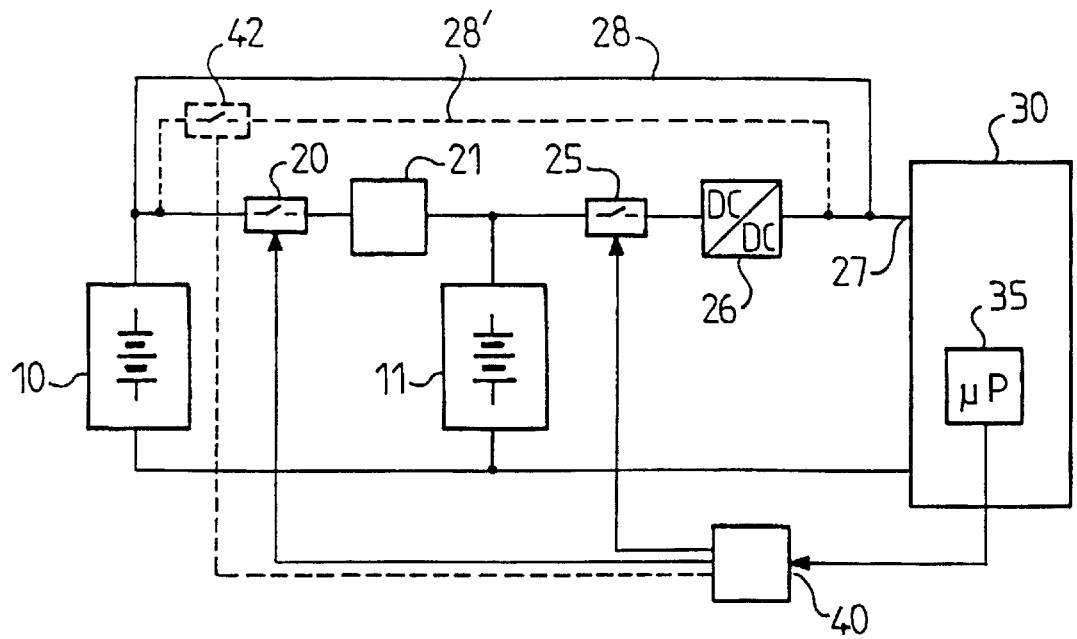
FIG. 3 shows a device according to the invention.

The device that provides this power supply is shown in FIG. 3. The accumulator 10 may be formed by an assembly of accumulator elements of the lithium type which may contain much energy but which cannot rapidly restore the energy in their charging circuit. The accumulator 11 may be formed by an assembly of accumulator elements of the lead-acid type as described in U.S. Pat. No. 5,047,300. This type of accumulator is well adapted to rapid discharges in their charging circuit. These two accumulators 10 and 11 are connected by a connection circuit formed by:

a first series combination of a switch circuit 20 and a charging circuit 21 which interconnects the accumulators 10 and 11, a second series combination of a second switch circuit 25 and a converter 26 for adapting the voltage produced by the accumulator 11 with the voltage required by the terminal across its power supply terminal 27, and a connection 28 which directly connects the accumulator to the load.

The circuit 21 may be formed by a simple wire, or also a circuit which regulates the load of the assembly 11.

Reference 30 indicates in this figure the electronic circuit of this terminal. In this circuit 30, a signal is derived which is active during said time slots . . . T1, T2, T3, . . . , notably coming from a microprocessor 35 which manages the transmission time.

Based on this signal, a control circuit 40 supplies control signals to the switch elements 20 and 25 in the following manner.

When the terminal is in the state of rest, it is directly fed by the accumulator 10 and the switch element 20 is closed, so that the charging of the accumulator 11 is ensured. The switch element 25 is open.

When the terminal is in the active state, it is fed by the converter 26 which supplies the required voltage by obtaining the energy in the accumulator 11. The switch element 20 is open so that the accumulator 11 is separated from the accumulator 10. The switch element 25 is then closed. The voltage supplied by the converter 26 starts to assist accumulator 10.

As a variant, it is also possible to replace a connection 28 by a connection 28' shown in a dashed line. This connection comprises a switch element 42 which disconnects this link under the control of the circuit 40 during the active states. Therefore, the switch element 42 is put in the open position.

The switch elements may be formed by a series and/or parallel assembly of accumulator elements, whereas the switch elements 20, 25, 42 may be MOS-type solid-state switches. The accumulator may be constituted by (a) high-capacity condenser(s).

What is claimed is:

1. An accumulator device for an apparatus operating intermittently between an active state and a standby state, said accumulator device comprising:

a first accumulator connected to provide power to said apparatus during said active state and said standby state;

a second accumulator;

a connection circuit having a first switch located between said first accumulator and said second accumulator, and a second switch located between said second accumulator and said apparatus; and a control circuit which controls said connection circuit to close said first switch and open said second switch during said standby state, wherein said control circuit controls said connections circuit to open said first switch and close said second switch during said active state.

2. The accumulator device of claim 1, wherein said first accumulator charges said second accumulator during said standby state.

3. The accumulator device of claim 1, further comprising a charging circuit located between said second accumulator and said first switch.

4. The accumulator device of claim 1, further comprising a converter located between said second switch and said apparatus.

5. An accumulator device for an apparatus operating intermittently between an active state and a standby state, said accumulator device comprising:
- a first accumulator connected to provide power to said apparatus;
- a connection circuit;
- a second accumulator; and
- a control circuit which controls said connection circuit to connect said second accumulator to said apparatus in said active state, and to charge said second accumulator from said first accumulator charge in said standby state.

6. The accumulator device of claim 5 wherein in said standby state, said control circuit disconnects said second accumulator from said apparatus and connects said second accumulator to said first accumulator.

7. The accumulator device of claim 5 wherein in said standby state, said control circuit connects said second accumulator to said first accumulator.

8. The accumulator device of claim 5, further comprising a charging circuit located between said second accumulator and said first accumulator.

9. The accumulator device of claim 5, further comprising a converter located between said second accumulator and said apparatus.

10. A terminal having an accumulator device and operating intermittently between an active state and a standby state, said accumulator device comprising:
- a first accumulator connected to provide power to said terminal;
- a connection circuit;
- a second accumulator; and
- a control circuit which controls said connection circuit to connect said second accumulator to said terminal in said active state, and to charge said second accumulator from said first accumulator charge in said standby state.

11. The terminal of claim 10 wherein in said standby state, said control circuit disconnects said second accumulator from said terminal and connects said second accumulator to said first accumulator.

12. The terminal of claim 10 wherein in said standby state, said control circuit connects said second accumulator to said first accumulator.

13. The terminal of claim 10, further comprising a charging circuit located between said second accumulator and said first accumulator.

14. The terminal of claim 10, further comprising a converter located between said second accumulator and an output of said accumulator device.

* * * * *